Nov. 20, 1923.
I. STOLPER
DENTAL APPLIANCE
Filed April 28, 1922
1,474,497
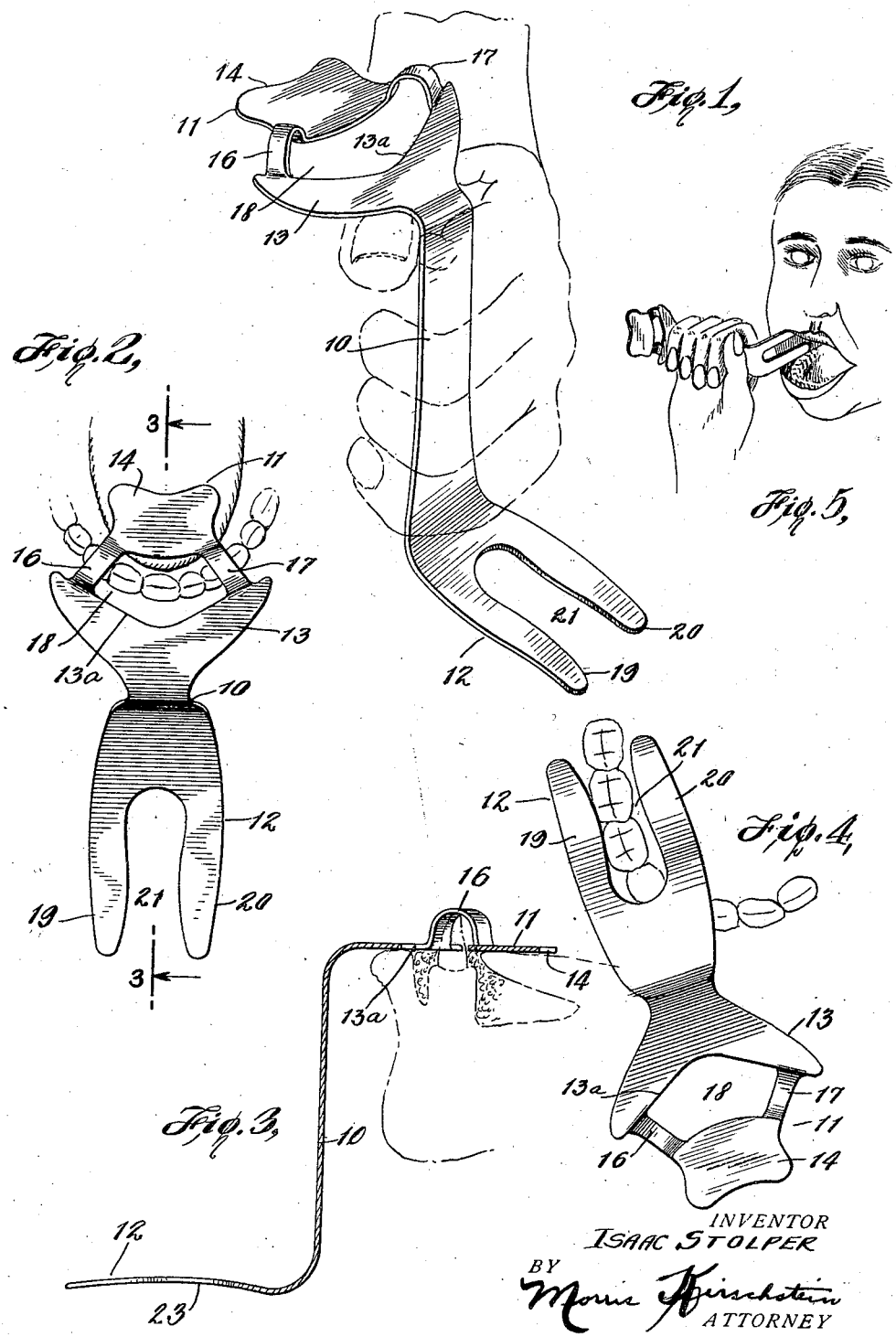
INVENTOR
ISAAC STOLPER
BY
ATTORNEY Patented Nov. 20, 1923.

1,474,497

UNITED STATES PATENT OFFICE.

ISAAC STOLPER, OF NEW YORK, N. Y.

DENTAL APPLIANCE.

Application filed April 28, 1922. Serial No. 557,159.

*To all whom it may concern:*

Be it known that I, ISAAC STOLPER, a citizen of the United States, residing at the city of New York, in the county of Kings and State of New York, have invented certain new and useful Improvements in Dental Appliances, of which the following is a specification.

This invention relates to dental appliances. More particularly it is directed to dental appliances adapted to hold and control the tongue, cheeks and lips of a patient while the teeth are being treated.

One object of this invention is to provide an appliance of the character described which may be held in desired adjusted position in the mouth by the patient, and shall be free from spring members, or other devices for mechanically securing the appliance in position in the patient's mouth.

Another object of the invention is to provide a combined dental appliance in the form of a simple, light and unitary device adapted to be used both for controlling the tongue and the cheeks and lips of the patient, and holding in position the rolls of cotton or wool introduced between the gums of the teeth, while the latter are being treated.

A still further object is to provide a combination dental appliance which shall be adapted for use both in connection with holding in position the cotton rolls or other material introduced between the teeth and the gums, and as a means for retracting either cheek when desired.

Another object is to provide a device of the character described which shall be simple in construction, cheap to manufacture and efficient in operation to a high degree, and which may be easily manipulated and sterilized.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a perspective view of a dental appliance embodying my invention;

Fig. 2 is a plan view of the embodiment illustrated in Fig. 1 showing the appliance in use for controlling the tongue and lips when the front teeth are being treated;

Fig. 3 is a cross-sectional view cut along line 3—3 of Fig. 2;

Fig. 4 is a plan view of the dental appliance showing the same in use in controlling one of the cheeks of the patient when treating the side teeth; and Fig. 5 is a perspective view showing the appliance in use as a cheek retractor.

Referring in detail to the drawing, the dental appliance embodying my invention there shown, is seen to comprise a shank 10 adapted to serve as a handle. Extending from one end of the shank, substantially at right angles thereto, is a tongue and lip control member 11, and extending from the other end of the shank and bent at right angles thereto in the opposite direction is a cheek control member 12, the instrument thus comprising a unitary integral device substantially Z-shaped in cross-section, as will be readily understood. The tongue and lip control member 11 comprises a lip rest 13 and a tongue piece 14 raised above the lip rest and connected thereto by means of bridge members 16, 17, thus providing a curved opening 18 conforming to the curvature of the front teeth of the upper portion of the chin. The front teeth are exposed through said opening with the tongue piece 14 resting on the tongue and the edge $13^a$ of the lip rest pressing down on the cotton roll (not shown) as illustrated in Fig. 2. The cheek control member 12 comprises a flat piece having a pair of prongs 19, 20 lying in the same plane and spaced from each other as at 21, the recessed portion 21 serving to expose the side or cheek teeth as shown in Fig. 4 with one of the prongs such as 19 acting to keep the cheek away from the teeth and holding the cotton roll between the teeth and cheek in position, while the other prong keeps the tongue away from the teeth and holds in position cotton rolls between the teeth and the tongue. The member 12 is preferably curved as shown in Fig. 3 so that the prongs 19, 20 present convexly curved contact surfaces as shown at 23, for more conveniently adjusting the same in the mouth.

The appliance is adjusted by the dentist in desired position in the patient's mouth, and the patient may then hold it in adjusted position with his hand gripping the shank 10 as shown in Fig. 1. No spring or clamp pressure is thus applied to the patient's mouth or other parts, the patient very easily adjusting the pressure by hand. It has been found that apart from the comfort thus afforded by the personal adjustment of the pressure by the patient, the fact that the patient is holding something in his hand while the dentist is operating serves to take the patient's mind off the operation itself with the beneficial psychological result that the patient's attention is drawn away from the usually attendant pain. This psychological effect has been noticed to be especially marked in patients of tender age.

The appliance may be easily made from light metal properly plated or coated and being unitary and integral in construction, requires no attachment or adjustment of parts, but is always ready for immediate use. Being furthermore free from separate parts and springs, the instrument is readily sterilized and free from the danger of rust or foreign matter gathering in joints or connecting portions as happens where several parts that have to be assembled are employed.

In Fig. 5, the instrument is shown in use as a cheek retractor, the member 12 being inserted at right angles to its normal position and urged against the cheek to retract the same as will be clear from the figure, with the convexly curved surfaces in contact with the cheek.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. A dental appliance comprising a shank handle member, a forked member extending from one end of said shank substantially at right angles thereto, and a tongue and lip piece extending from the other end of said shank substantially at right angles thereto, and comprising a curved portion adapted to act as a lip rest and tongue piece raised above said lip rest and spaced therefrom.

2. A dental appliance comprising a substantially Z-shaped member, one end of the Z being forked for the purpose described and specified, and the other end being shaped to provide a tongue and lip piece, and the intermediate portion of the Z-member adapted to serve as a handle, the member as a whole being reversible so as to dispose either end in operative position.

3. A dental appliance comprising a shank handle member and a tongue and lip piece extending from said shank substantially at right angles thereto, and comprising a curved portion adapted to act as a lip rest and tongue piece raised above said lip rest and spaced therefrom.

In testimony whereof I affix my signature.

ISAAC STOLPER.